(12) United States Patent
Sypko

(10) Patent No.: US 11,509,698 B2
(45) Date of Patent: Nov. 22, 2022

(54) METHOD AND SYSTEM FOR INTERACTIVE USAGE OF PRODUCT OR SERVICE CARDS IMPLEMENTED IN REAL-TIME COMMUNICATION SYSTEM

(71) Applicant: LiveChat Software S.A, Wroclaw (PL)

(72) Inventor: Michal Franciszek Sypko, Tarnowskie Góry (PL)

(73) Assignee: LIVECHAT SOFTWARE S.A., Wroclaw (PL)

( * ) Notice: Subject to any disclaimer, the term of this patent is extended or adjusted under 35 U.S.C. 154(b) by 0 days.

(21) Appl. No.: 17/194,524

(22) Filed: Mar. 8, 2021

(65) Prior Publication Data
US 2022/0286487 A1  Sep. 8, 2022

(51) Int. Cl.
| | |
|---|---|
| *H04L 12/00* | (2006.01) |
| *H04L 65/401* | (2022.01) |
| *G06F 16/22* | (2019.01) |
| *H04L 65/4053* | (2022.01) |
| *G06F 16/9032* | (2019.01) |
| *G06F 16/28* | (2019.01) |
| *G06F 12/122* | (2016.01) |

(52) U.S. Cl.
CPC ...... *H04L 65/4015* (2013.01); *G06F 16/2264* (2019.01); *G06F 16/283* (2019.01); *G06F 16/90324* (2019.01); *H04L 65/4053* (2013.01); *G06F 12/122* (2013.01)

(58) Field of Classification Search
CPC ............ G06F 12/122; G06F 16/90324; G06F 16/283; G06F 16/2264; H04L 65/4053; H04L 65/4015

USPC .................................................. 709/204, 205
See application file for complete search history.

(56) References Cited

U.S. PATENT DOCUMENTS

| | | | | |
|---|---|---|---|---|
| 2008/0313507 | A1* | 12/2008 | Mahmud ............... | G06F 11/008 714/49 |
| 2016/0357437 | A1* | 12/2016 | Doerner ................ | G06F 3/0613 |
| 2019/0037051 | A1* | 1/2019 | Pimentel ................ | H04L 67/01 |

FOREIGN PATENT DOCUMENTS

| | | | | | |
|---|---|---|---|---|---|
| JP | 2009072480 | A | * | 4/2009 | ......... H04L 65/4015 |
| KR | 20110100767 | A | * | 9/2011 | ............... G06F 8/62 |
| KR | 2020073502 | A | * | 6/2020 | .......... G06F 11/1625 |
| WO | WO-2016045180 | A1 | * | 3/2016 | ............. D06F 33/02 |

* cited by examiner

*Primary Examiner* — Frantz Coby
(74) *Attorney, Agent, or Firm* — Jacob Eisenberg

(57) ABSTRACT

The present disclosure is directed to a system and method for a content display located in the chat messaging system. It facilitates communication between at least a first and a second user and further enables content sending in a more efficient and faster way. This disclosure enables users to work with complimentary and different real-time communication systems and enables the display of interactive elements presenting objects in an application. Such display may be personalized and lead to external sources like a web page or other catalog of data with further explanation necessary to purchase or order. Furthermore, the disclosure improves the storage of content that will be displayed upon a frequency of usage and distribute such storage upon two types of memory that communicate over the network.

19 Claims, 15 Drawing Sheets

METHOD AND SYSTEM FOR INTERACTIVE USAGE OF PRODUCT OR SERVICE CARDS IMPLEMENTED IN REAL-TIME COMMUNICATION SYSTEM

BACKGROUND OF THE INVENTION

Instant messaging systems are one of the most commonly known and used types of customer services available. Mentioned systems, such as chat channels, are exchanging messages in real-time over a computer network. Customer service, delivered in real-time, brings with it certain challenges during an online conversation. Among others, real-time messaging requires a high level of responsiveness and unlike other forms of communication, such as email, customer expectation has evolved to the point of always expecting precise instruction, feedback and the like within a couple of seconds of the initial inquiry. This approach causes stress and inconvenience to the customer service agent tasked with delivering customer service to the customer or end-user. Such may be especially true when the agent must call upon external resources and somehow incorporate them directly into the chat window. Gathering external sources, ranging from the relatively simple link to the more complex images, videos or gifs, require a certain storage infrastructure and is oftentimes time consuming, especially when it comes to selection, uploading, and final sending.

Current solutions do not address the aforementioned problems relating to fast access to information and accessible selection thereof. What is more, none of the existing solutions take into account the effectiveness and costs of a potential integration with instant messaging systems. Therefore, a need exists in the art for fast and effective communication as well as fast access to information as they pertain to the field of chat-based real time customer service.

BRIEF SUMMARY OF THE INVENTION

The present disclosure is directed to Internet-based communication systems designed to cooperate with online messaging channels, as for example chats. In particular, the present disclosure makes use of networked storage centers to optimize communication between end-users and chat operators as well as enables faster access to information. Combinations of on-site and on-server storage techniques used in the present invention provide possibilities for easy access to complex catalogs of data without the necessity to store product or service data locally in order to present it to the customer. Furthermore, it enables external linking between embodiments of the present disclosure that enable the end-user to responsively interact with objects displayed via a chat window.

The present disclosure finds application with messaging systems via its API that facilitates the connection between the embodiment and networked communication channels.

An object of the present disclosure is to display data during real-time messaging via a chat window, the data being available for use in displaying any product, good, or service offer. Its construction enables full customization of what is displayed and what selection options are given to the end-user in a chat window. Such an embodiment enables multiple ways of presenting objects in the interface of the application—as the source of data transferred to the chat application is flexible and enables storage of different types of data, the embodiment may display two-dimensional as well as three-dimensional shapes or even present videos or custom displays to present objects otherwise defined by the user. This and related embodiments serve as an interaction system and method enabling real-time in communication system data display. It connects predefined data available on the external server infrastructure to be displayed or directly linked in the communication window, as for example, a chat window. The main benefit of the this and other embodiments is that they enable the display of the product or service information with no need to level the communication system by both an agent and a visitor.

As used herein, an agent shall be understood as a person responsible for chat conversation from the side of a business provider, such as an e-commerce sales representative responsible for chat conversations performed online. Visitors, sometimes also referred to as end-users, shall be understood as the person(s) visiting the webpage and potentially contacting the agent via a chat communication system.

The embodiments are designed for online communication via any type of instant messaging system available via the Internet on any device with access to the page or application with the embodiment located on it. It shall be accessible on both standard and mobile application versions.

BRIEF DESCRIPTION OF THE SEVERAL VIEWS OF THE DRAWING

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, advantageous examples of the disclosure are set out with reference to the accompanying drawings, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" A, B, and C" should be understood as including only one of A, only one of B, only one of C, or any combination of A, B, and C. In the figures, the same or functionally identical elements have been provided with the same reference signs.

Figure 1:
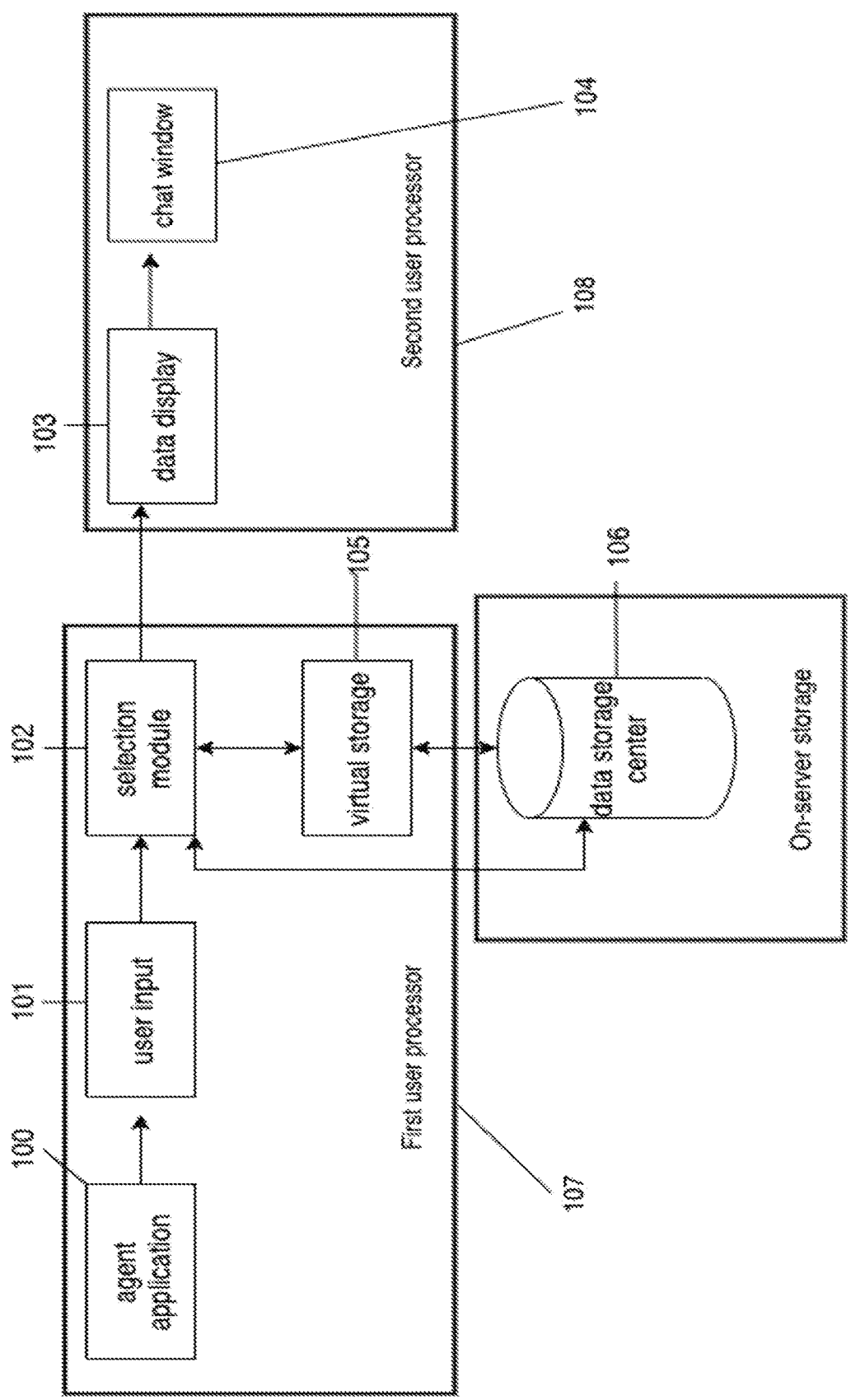
FIG. 1 depicts a simplified connection scheme between the first and second user of the invention with storage centers divided into data storage center and virtual storage.

By way of a first embodiment, the present disclosure will be described with respect to a system and method composed of a storage infrastructure that communicates with the agent application and chat's communication infrastructure over a network. FIG. 1 depicts an interaction between a first user and a second user. The first user processor (107) is configured with data input (101) configured and arranged on a suitably configured and arranged processor that is directly connected to a selection module (102). The selection module (102) is an element that facilitates data exchange between storage infrastructure, both virtual (105) and physical (106), and processors of the first and the second user as presented on FIG. 1 107 and 108.

As further depicted in FIG. 1 the selection module (102) can directly and independently communicate with at least one of the virtual storage (105) and data storage center (106). Furthermore, data, extracted from the storage is transferred to the processor of a second user and displayed there (103) to the second user (104). The display shall be performed in the instant communication channel within the conversation window.

Embodiments of the present disclosure are composed of three infrastructural elements, namely: 1) a local storage configured on the first user browser (105), 2) a data storage center configured on a server that provides a physical location of data (106), and 3) a front-end interface that enables the first user to select data (101) to be displayed on the screen of the second user (104). All of the above are configured to communicate over a computer network and to be used within instant communication channels as chat. The embodiments are complimentary with any type of device having some form of Internet access that can display a web page or application with chat installed on it.

FIG. 1 further depicts a process including a storage infrastructure, namely with a storage database (106) and selection module (102) which connects with the infrastructure of the instant messaging application to further display data and with virtual storage configured on the browser. The selection module is responsible for choosing a card or a group of cards by the first user (100) and displaying it in the chat window located on the webpage with chat embedded therein. All elements of the disclosure operate between each other thanks to the networked infrastructure.

Embodiments of the present disclosure include data storage that is configured to organize data in an independent manner to enable access to such data in case of a query requesting partial scope of data kept in a particular database table as presented on FIG. 1. This implementation solves the issue of fast access to data in the following use case: the first user requests objects that are located in the virtual storage (105) and in the data storage center (106). Objects located in the data storage centers are located in two different tables organized as different shops. The disclosure is capable of extracting at the same time data from the virtual storage as well as scattered data from the data storage upon a query performed by the selection module (102).

Figure 2:
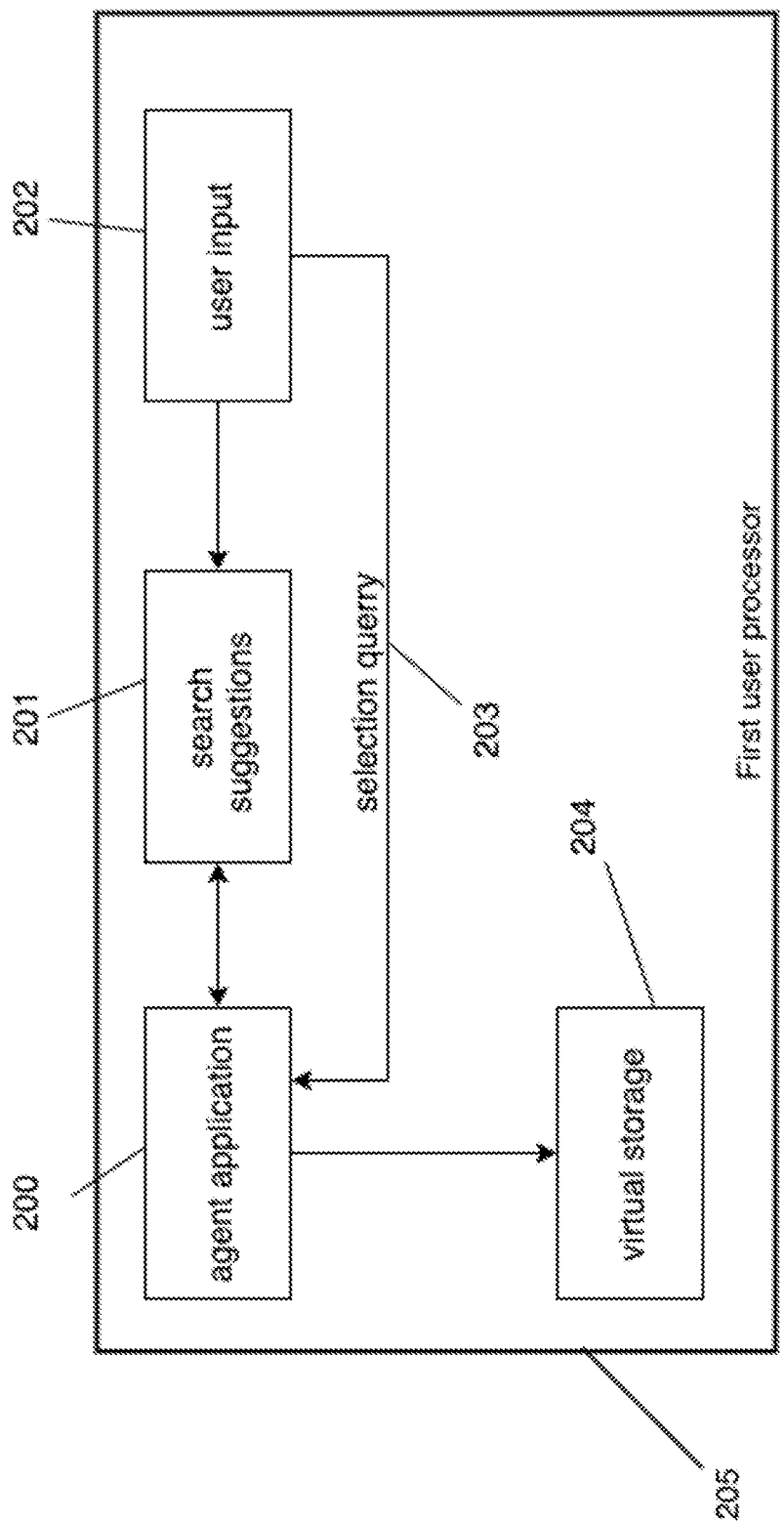
FIG. 2 depicts how user input is connected with the processor of the first user where the invention is configured and with virtual storage.

FIG. 2 presents an interaction between elements of the embodiment of the disclosure—namely how apparatus elements communicate with one another. As depicted in FIG. 2 user input is enabled to perform queries and select from all accessible data or selected suggestions from the user interface (202). The first user operates within the scope of the first user processor (205) that operates with virtual storage and provide suggestions (201) to the content entered by the first user via user input (202) to extract data saved in the storage. As shown, the user may direct such queries (203) to access data that are being stored in the virtual storage (204). Such access is triggered by the processor of the first user (200).

Figure 3:
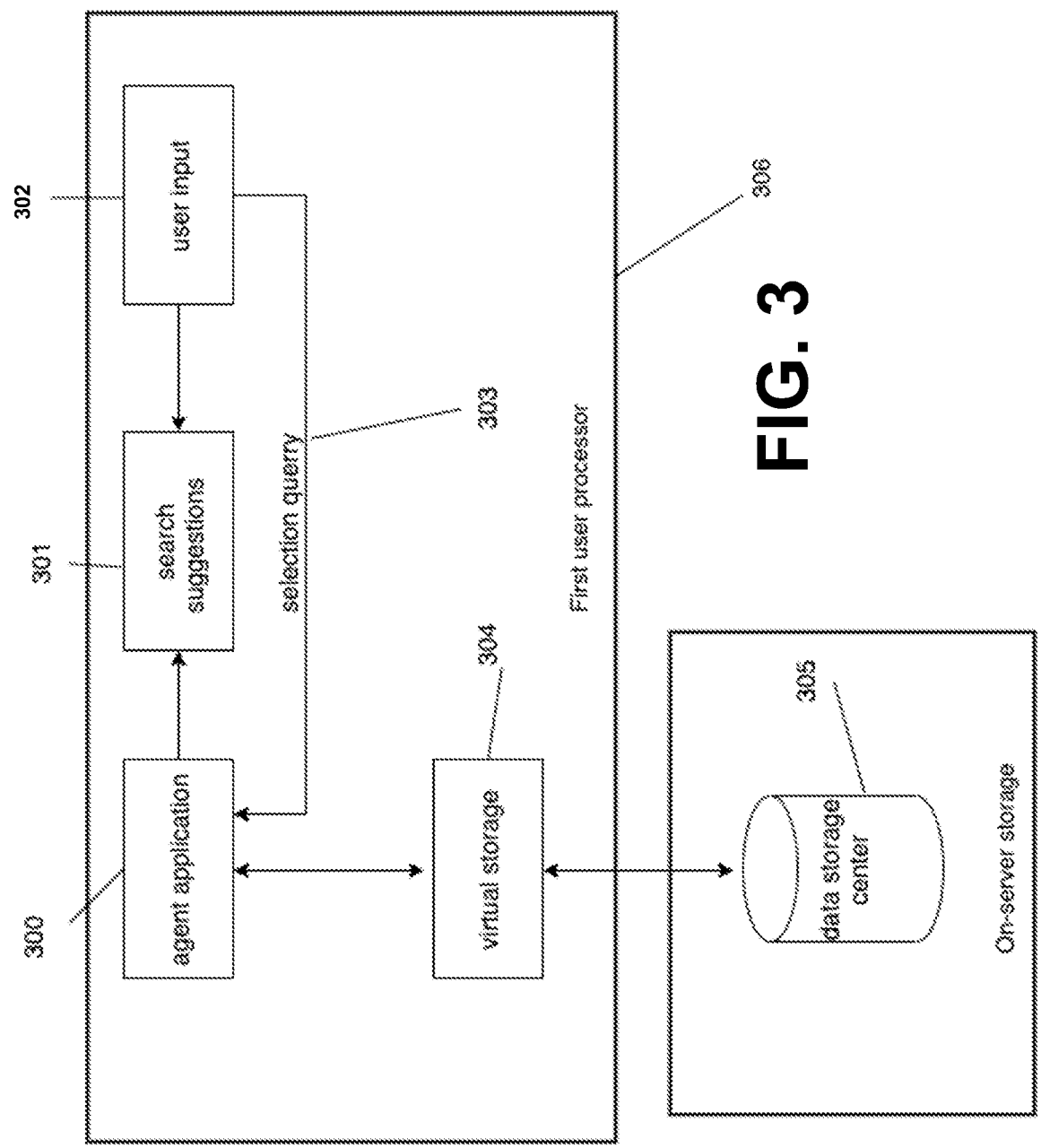
FIG. 3 depicts how user input is connected with the processor of the first user where the invention is configured, with a virtual storage and with a data storage center.

FIG. 3 depicts an interaction between elements of the embodiment of the disclosure—namely how apparatus elements communicate with one another in the case of on-server processing performed in the database. As depicted in FIG. 3, the first user may request other sources of data from a data storage center. In such case first user processor is configured to communicate with agent application (300) and to generate search suggestions (301) available via user input (302). Requesting of data from the user input to the virtual storage is performed by the selection query (303). A processor of the first user (306), when configured and arranged to communicate with user input (302), may further perform queries to at least one of virtual storage (304) and data storage center (305).

Figure 4:
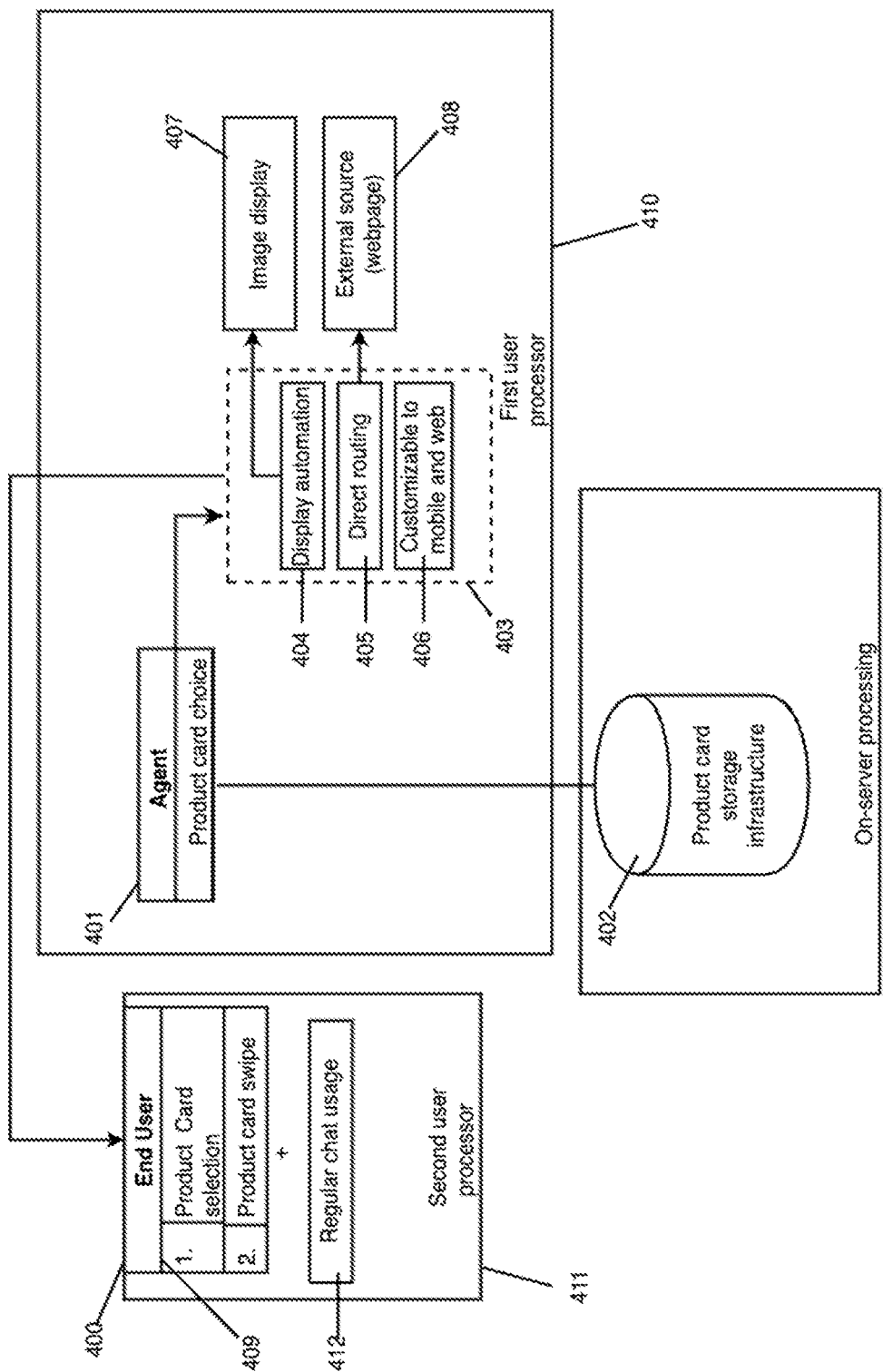
FIG. 4 depicts networked communication between the elements of the system divided into three categories: infrastructure responsible for storage, display for the Agent (first user of the invention), and display for the end-user (second user of the invention)

FIG. 4 depicts a process whereby customer-driven services that aim to provide information as a response to customer inquiries is depicted. FIG. 4 presents an interaction between elements of the embodiment of the disclosure and its location. As presented on FIG. 4, the processor of the first user (410) is configured to work with the second user processor (411) and further configured to communicate with the data storage center 402. Certain embodiments are configured to work with real-time communication channels and to send messages via such networked channels to the customer (400). An end-user or second user may interact with the depicted process directly from the instant communication window.

Furthermore, FIG. 4 depicts the perspective of an agent or first user (401), a system and method of selection and direct insertion of a product or service presentation into a conversation with the customer with no need to insert a link to the external source (408). The system supports different graphic elements (407) and may display more than one object in one conversation.

The system of FIG. 4 as depicted is prepared to automate the display (404) process triggered by the first user of the embodiment, providing direct routing (405) to the other sources configured by the Agent. Furthermore, this embodiment is configured and arranged to provide full responsiveness in case of mobile device usage (406). These examples of applicable use towards product card configuration are presented on 403, which collects potential types of product cards content and implementation.

Furthermore, still, other embodiments of the present disclosure may serve as a method for data selection and display in the agent application where the agent is assisted with an automated selection and/or modification of the categories of data based upon a frequency of usage. This connection between Agent application (401) and product card storage infrastructure (402) is enabled over the networked connection.

As presented in FIG. 4, the agent application (401) is directly connected and configured to work with a virtual storage and data storage center, where all data concerning display and its elements as well as personalization assets are stored. What is more, agent application display (404) enables such card choice and customization, which means that the agent can effectively select a card that possesses: 1) responsive image—the product card may possess scaled image or video content or a sequence of mentioned contents displayed within frames preselected for this card, 2) direct routing that may lead to the external webpage opened in a separate window or displayed in a scaled manner within the same window, and 3) a card with a preferred scale associated with a device on which it is displayed, consequently, access to the information displayed by the card can scale up or down according to the settings recorded by the display space (messaging window).

The system depicted in FIG. 4 fully operates integrated within the chat window, consequently, it does not interfere with communication flow (400). Card display may be preceded by or followed by regular plain text conversation, links, other cards, or any type of content usually displayed during a chat conversation. Furthermore, an end-user is able to select the card or swipe displayed content to choose one or more objects out of what is selected as presented by 409. This embodiment of the disclosure works in full compliance with a chat system, consequently an end user is able to access, use and interact with a product card during regular chat usage (412).

Figure 5:
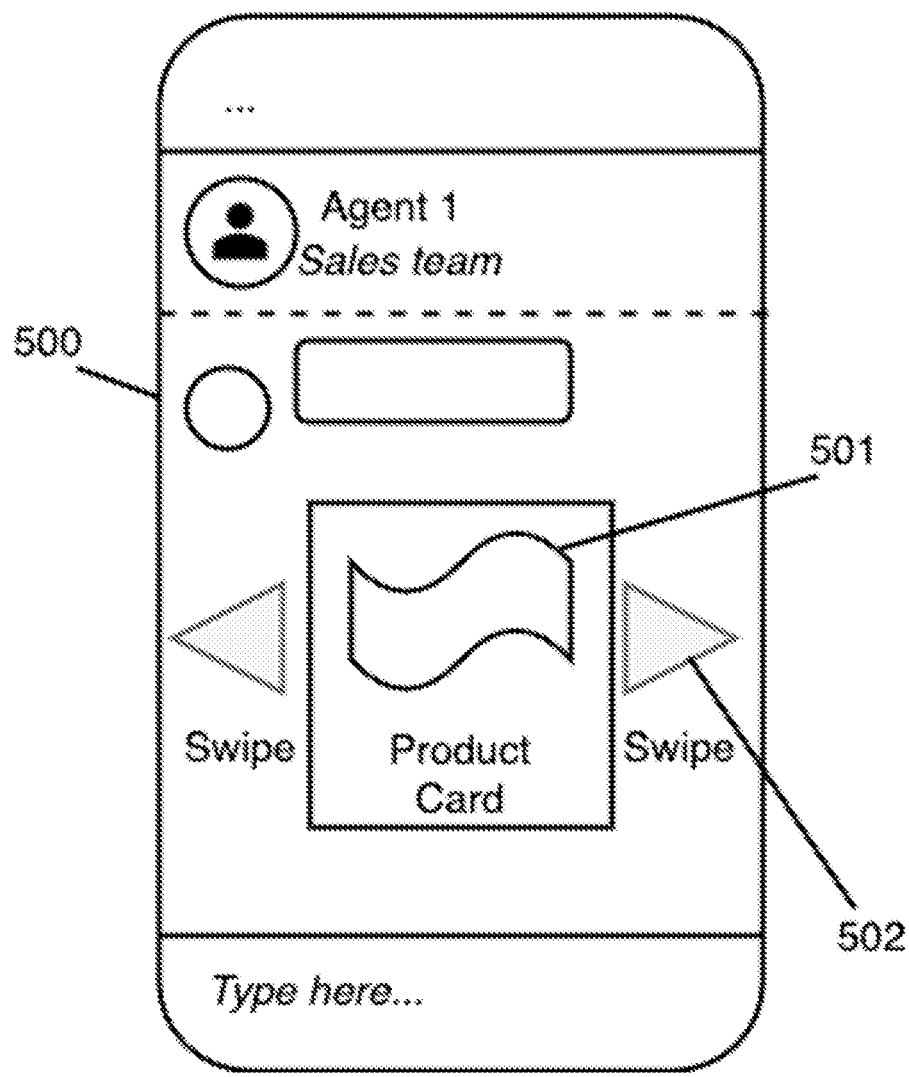
FIG. 5 depicts a context in which a product card is displayed to the end-user (second user of the invention) along with options to swipe objects in case of a plurality of displayed product cards.

FIG. 5 depicts a customer display including requested or suggested products and services in an instant messaging window (500). It is scalable and can display more than one object (501) that is accessible after a swipe indicated in the displayed graphic element in the front-end layer of the application (502). This element of the embodiment of a disclosure functions fully within the context of chat communication. It enables the second user to change product cards in case of a plurality of product cards shared by the messaging system at once. Element presented as 502 enables a move to the previous or next product card displayed on the processor of the second user.

The display of the product card along with its graphic representation and other accessible elements can be viewed on different types of devices ranging from mobile devices like smartphones or tablets to PC computers. This embodiment of the present disclosure includes a graphic representation that is displayed at the chat operating on multiple types of devices. In FIG. 5, instant messaging window 500 includes an example of a product card (501) displayed on a mobile device in the conversation window. Depending on the characteristics of the device, the embodiment shall scale up or down its size to ensure accessibility and responsiveness on the device where it is displayed.

Figure 6:
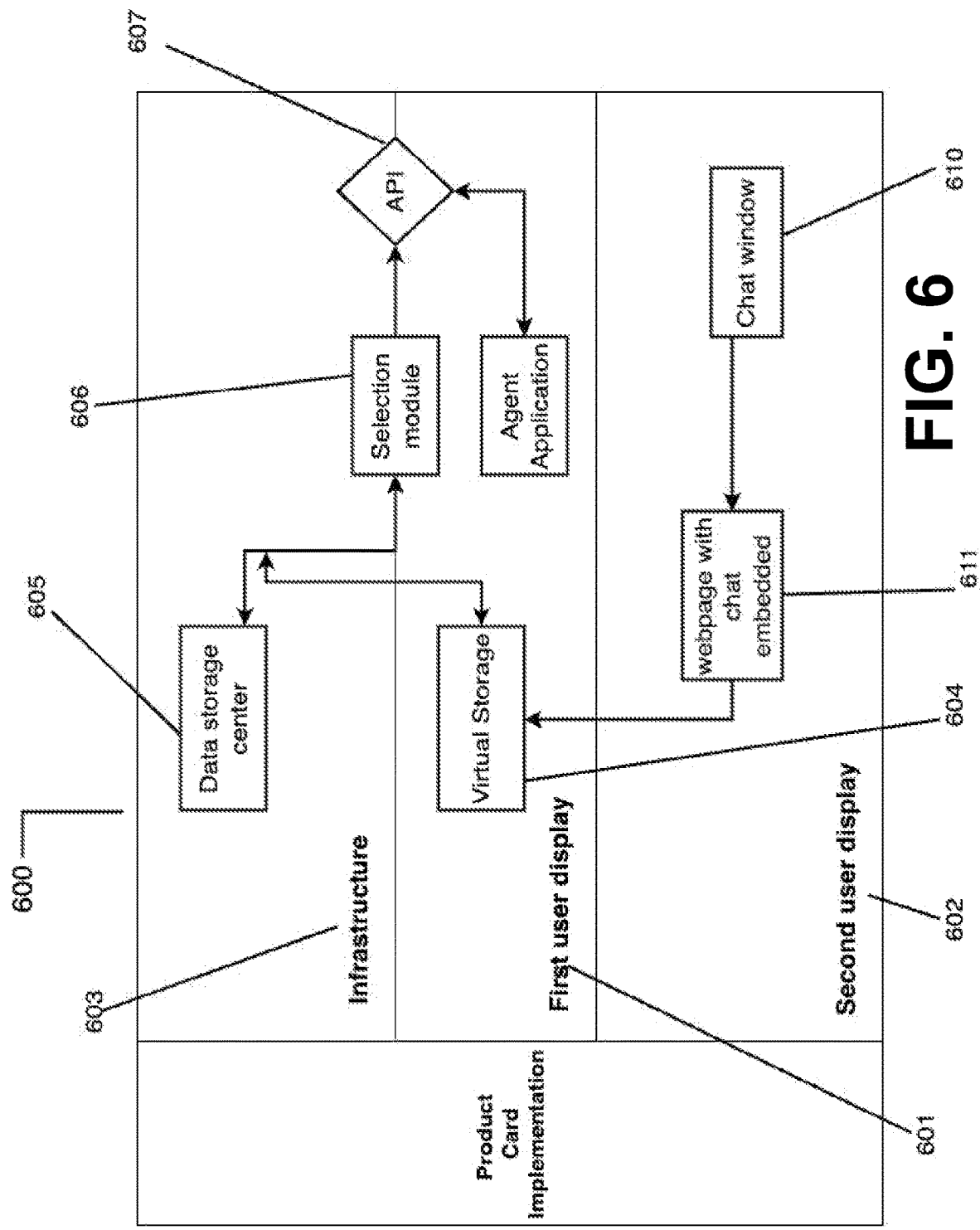
FIG. 6 depicts an embodiment of the present invention where both virtual storage operating on the browser and main data storage are located in the networked environment.

FIG. 6 presents elements of the apparatus location when it comes to the composition of matter. Layer defined as infrastructure (603) is responsible for server storage and contains a data storage center (605). Infrastructure should be understood as external to the processor of the first and the second user unit with a database configured and arranged on the physical server. Furthermore, the first user display layer (601) is arranged on the processor of the first user and is responsible for displaying information that is accessible for the first user, for example agent application interface (608), virtual storage (604). Lastly, the second user display (602) comprises the webpage with chat embedded (611) displayed by the second user and chat window (610) where the second user can directly enter the content further transmitted to the first user as the outcome of regular chat usage.

As depicted in FIG. 6, the system can operate with different instant communication channel providers due to extensive API (607) usage. A sequence of data is triggered by the Agent application (608) that communicates with storage infrastructure over API. Virtual storage (604) is configured and arranged on the processor of a first user and communicates over the network with a selection module (606) and data storage center. Consequently, data extracted from at least one virtual storage (604) or data storage center (605) is displayed to the second user within the chat window (610) on the page with the chat window embedded (611).

Figure 7:
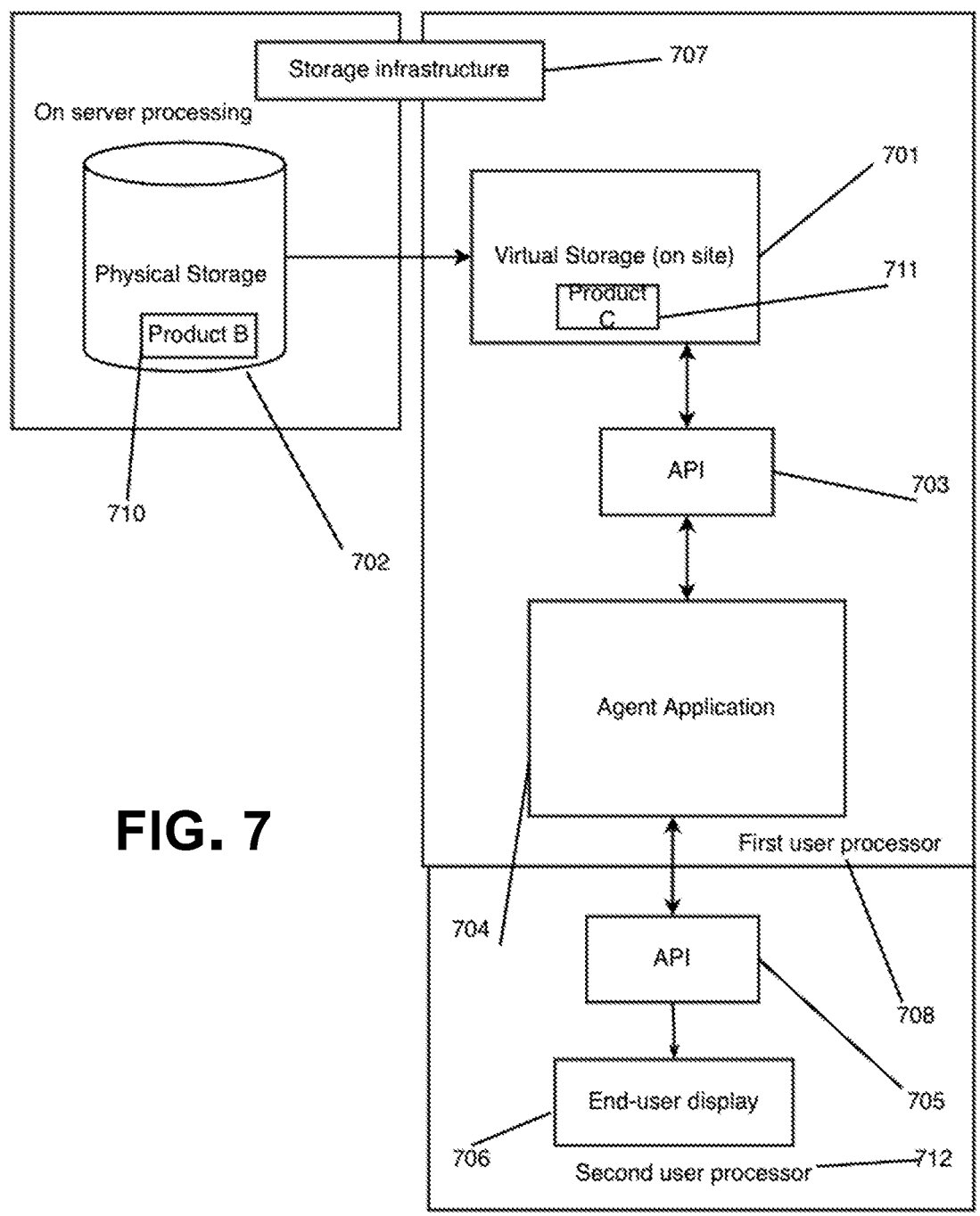
FIG. 7 depicts a flow of data available in a described embodiment of the invention where both virtual storage and data storage centers are in use.

FIG. 7 depicts a location scheme of the apparatus where virtual storage along with AP and Agent application are located on the first user processor (708) while the end user display along with API is located on the second user processor (712). Furthermore, communication between elements of this apparatus includes two types of memory wherein a product and/or service graphical representation is stored, namely: 1) a virtual memory configured on the site (702) and 2) a data storage center configured on the server as further depicted in (701). Data saved on those two types of memories constitute a catalog of data available for the agent to share with the customer via the end-user display (706). This embodiment of the disclosure facilitates communication with external elements over API modules (703 and 705). For example, in the present embodiments, a user can create a shop with a category of product computers where the category is further divided into laptops and personal computers. The agent selects certain subsets of category laptops including laptops with high-end screens containing three products. Products included in shop>computers>laptops>laptops with high-end screens>hereinafter referred to as Product A, Product C (711) will be stored in the virtual storage due to the frequency of access. Product B (710) that is requested less often than the other two from the category will be stored in the data storage center and call-back only in case of selection by the agent. If a selection frequency rises, this product card may be transferred to the virtual storage adjusting the catalog of data stored therein.

The apparatus that constitutes a system of the disclosure shall work in full compliance with instant messaging solutions providing close integration availability based on API calls or webhooks depending on implementation details that are conditional or infrastructure of the system where the embodiment will be settled. Usage of API as a connection between particular elements of the embodiment of this disclosure is depicted in FIG. 7 on elements 705 and 703. API in the present implementation shall be understood as a connection interface that enables particular elements of the apparatus to communicate with one another and to connect the system disclosure to different types of instant chat systems natively. API, as defined by 705, enables a second user processor to communicate with agent user application (704), and API as defined by 703, enables agent application (704) to communicate with virtual storage (701).

This embodiment of the product card allows a first user to freely configure the resources that will be displayed to a customer as a result of using the system. Moreover, a user of this invention can add product cards, organize them and combine them into larger categories by means of external communication through an API or by uploading files such as CSV, XML, or equivalent.

Figure 8:
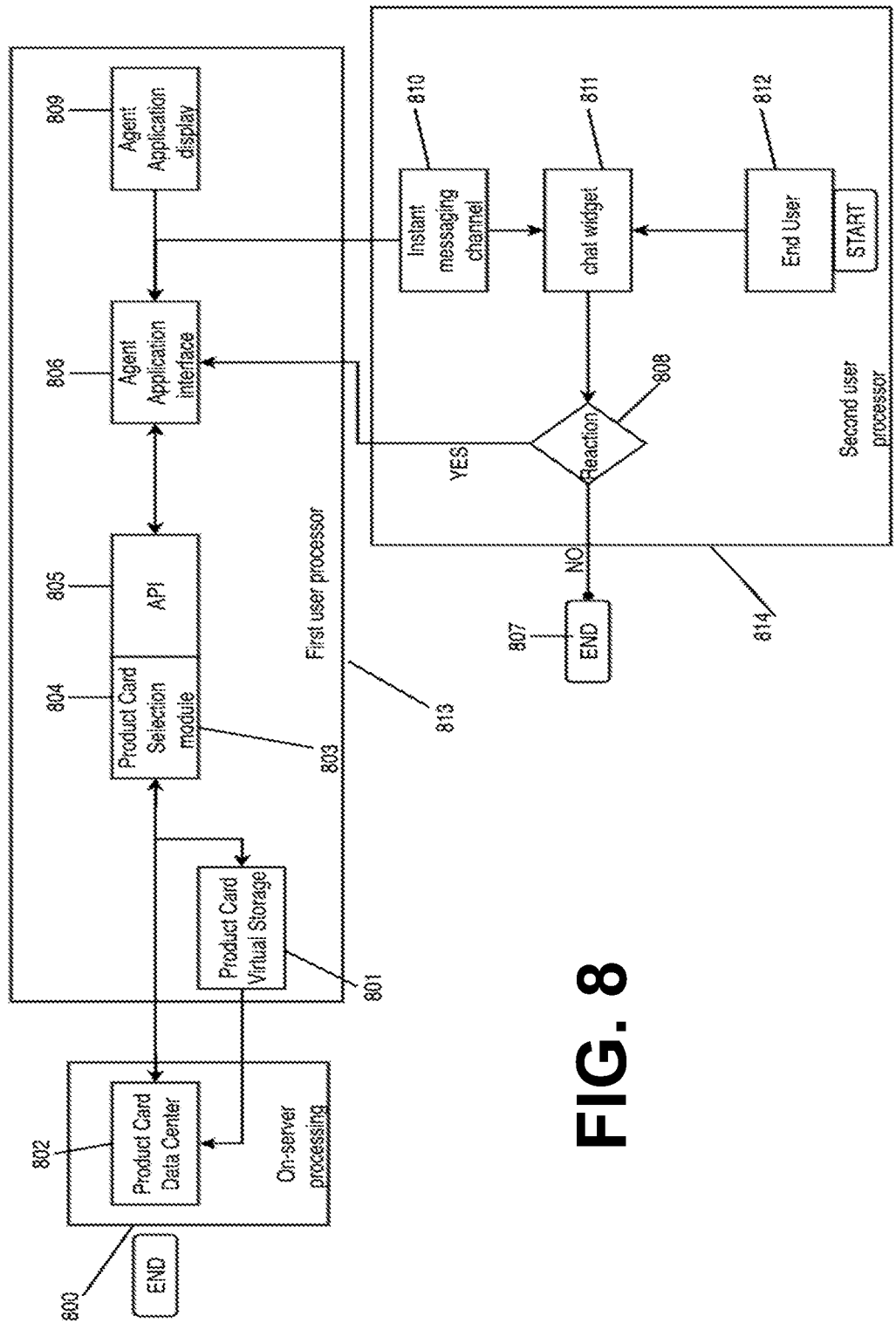
FIG. 8 depicts a flow of communication between elements of the invention over API access including a reaction of the end-user (second user of the invention)

FIG. 8 presents a system for communication between elements of the apparatus of the disclosure. This system depicts interactions between elements that are configured either on server (800), on the first user processor (813), or on the second user processor (814). FIG. 8 depicts interactions between storage (802 and 801), agent application (806), instant messaging channel (810), and API access that enables networked communication (805). As presented in FIG. 8, all elements of the present system communicate over a network, and requests sent to the storage center are operated via a product card selection module that directly queries data storage (either on-site or on the server) to extract data requested by the query.

Data flow begins with the end-user (812) and is further transferred to the agent interface (806) upon the reaction (808) of the second user to the product card displayed or pre-product card request sent. If there is no reaction from the second user, there is no information transferred to the agent interface. Examples of reaction 808 include: user clicked on the product card, user opened a link from the product card, user swiped product card, and user responded within chat communication window to the agent.

Agent application displays a catalog of data saved as product cards within agent application display (809) which may trigger product card selection over selection module (804) and communication with storage infrastructure of at least one virtual storage (801) or data storage center (802).

In FIG. 8, 809 presents how an agent application is located in the system, namely it is directly communicating with an agent application interface (806) that further communicates with the selection module (804) via API (805) and finally the data storage center (802) that enables access to the card preselected by the first user of the disclosure via the interface provided by the disclosure.

An embodiment of this disclosure addresses the issue of the interactive product cards displayed during chat conversations with the end-user (second user). It also enables the end-user to interact with the data displayed to the second user. FIG. 8 depicts how an end-user may interact with elements displayed by the card, namely, view it and/or interact with elements located on the card, as for example click on it. Such a reaction to what is displayed by the card shall trigger either a modification of such display or redirecting it to another source, for example, a webpage. Depending on the type and scope of reactions allowed on the product card, it may either cause a callback to the invention's selection module and as a consequence to the storage center or may select from categories of accessible resources gathered in the virtual storage of the browser. By product card it should be understood that it is a content displayed within the instant messaging system that is predefined by the agent in the storage. Product cards may comprise text, graphic content, video content or other multimedia.

Furthermore, FIG. 8 depicts a data storage center (802) that cooperates always jointly with at least a selection module (804) which functions also as a connector between both manual choices querying the content to be displayed to the end-user by the Agent (808 and 809) as well as the end-user reactions emitted from the chat widget (811). Queries performed by the agent may require a repeated search through resources located in the storage center.

Figure 9:
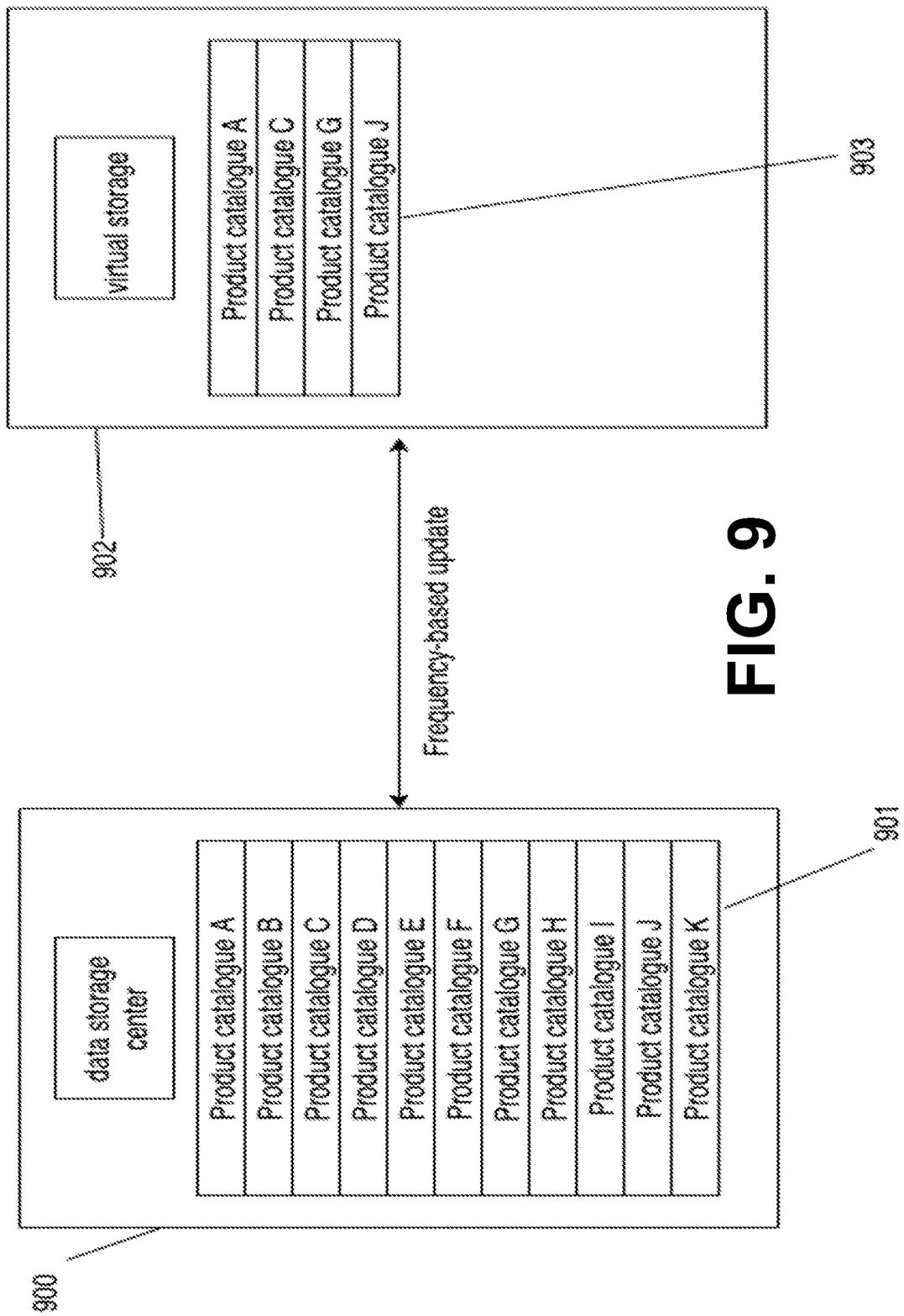
FIG. 9 depicts an interaction between virtual storage and data storage center along with data updates based on the frequency of queries.

By way of a further embodiment, it operates on organized data that is divided and stored in at least one of data storage or virtual storage. Such composition is depicted in FIG. 9. At least one of data storage (900) or virtual storage (902) is organized in a form of catalogs and sub-catalogs of data (901 and 904).

Queries performed by the first user affect the frequency of usage which leads to the adjustment of data stored by the virtual storage (902) and data storage center (900). The frequency of access defines the scope of data stored in each memory.

Figure 10:
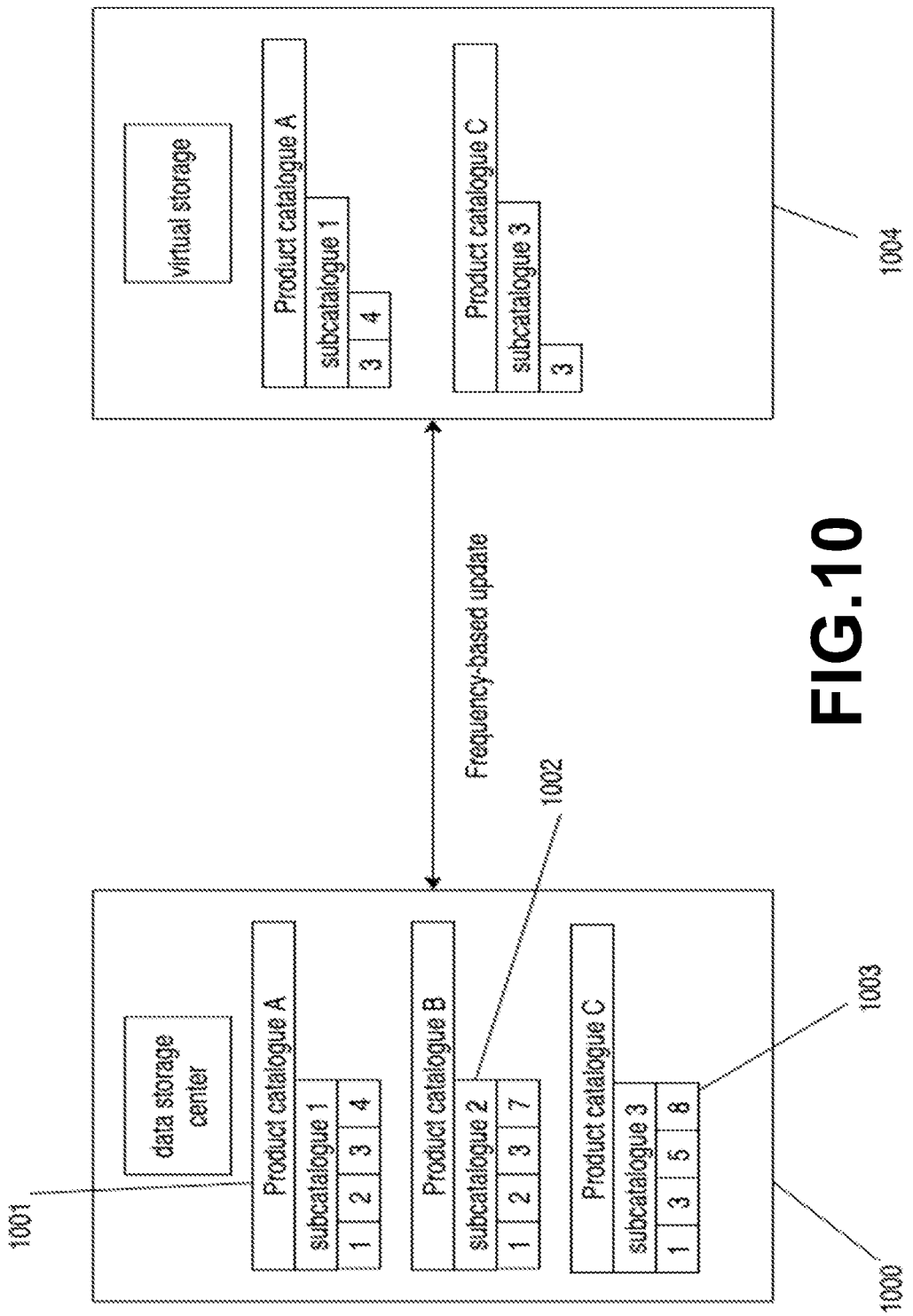
FIG. 10 depicts the difference between catalogs of data within the data storage center and virtual storage.

The frequency of access to a particular product card depends upon an agent's request sent to the infrastructure. Requests constitute technical queries that ask for particular data that are stored in at least one of the virtual storage or data storage centers. In the case of data stored only within virtual storage, the query should receive a response with a product card located there (1004). In case of the absence of such data, the remaining subset should be accessible within the data storage center (1000). Catalogs of data are being adjusted based on the frequency of usage as presented in FIG. 10. Consequently, virtual storage contains only a portion of the data most frequently accessed (1001) composed out of sub-catalogs (1003), and the virtual storage is configured to collect the remaining data.

An agent as a first user of this invention can set up a list of available stores or sites and products or services (objects to display) with all conditions of such display related to it. Displayed graphical representation of the product card may be composed out of, but not limited to the following features: 1) link to the external webpage, for example, online store; 2) picture or other visual representation; 3) description of the displayed object in a plain text; and 4) customizable parameter, for example, direct purchase link. The elements are flexible when it comes to implementation and may be generated in all types of formats—the practical limitation of the embodiment is the factual limitation of either the agent's or the visitor's device, browser, and/or application.

The agent is enabled to set up a list of available stores by defining it in the interface which collects elements inserted by the user. The agent can insert data including links to external sources, images, videos, other audiovisual content, or textual description. Furthermore, an agent is given the option to upload the content from external sources that communicate with the invention via data exchange layers.

Figure 11:
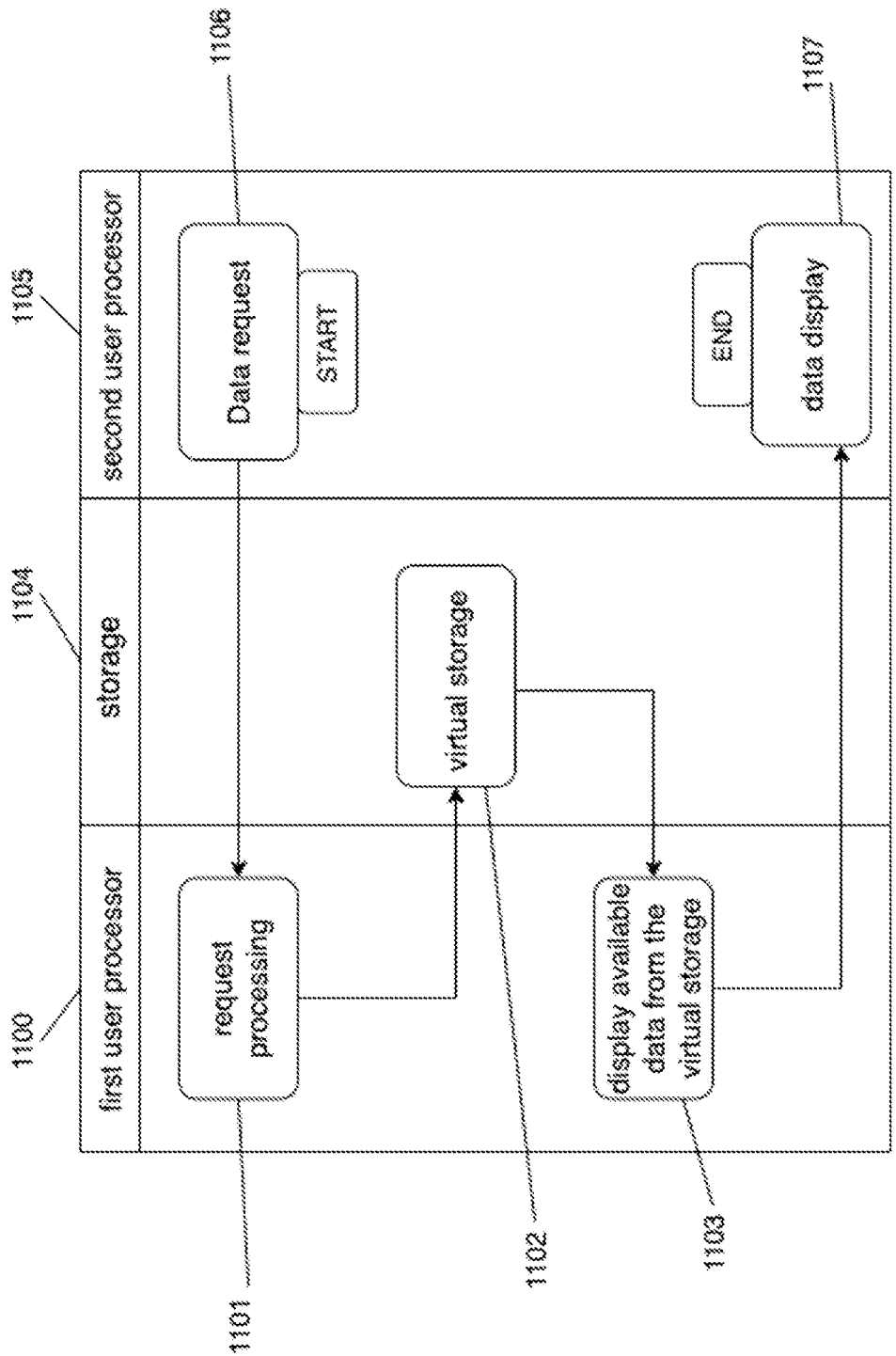
FIG. 11 depicts the interaction between the first user processor, second user processor, and storage infrastructure when only virtual storage is used by the invention.
Figure 12:
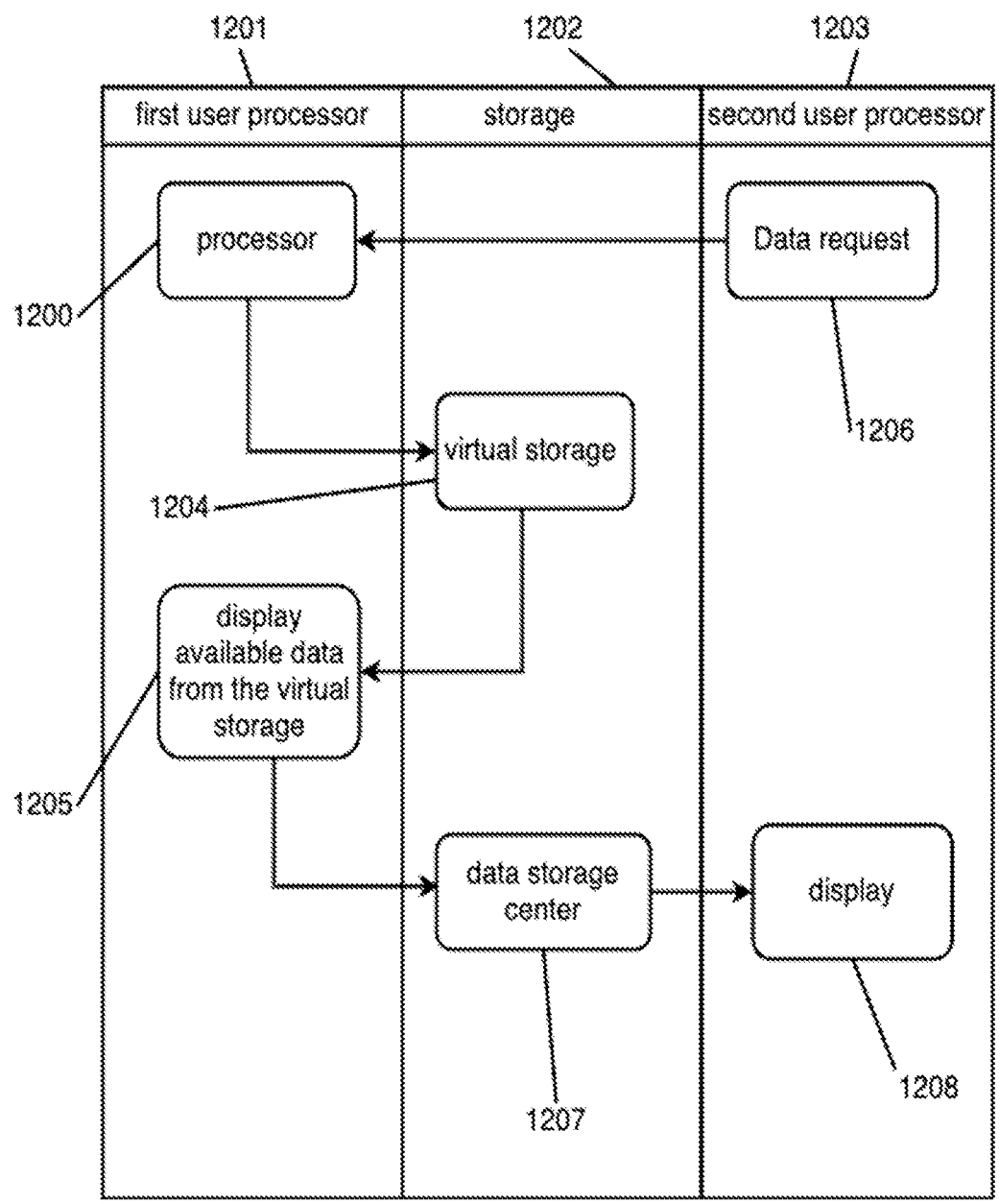
FIG. 12 depicts an interaction between the first user processor, second user processor, and storage infrastructure when both virtual storage and data storage center is used.

FIG. 11 depicts a method for communication between different layers of the disclosure. FIG. 11 further depicts a shorten flow of data in case of full accessibility of information within the virtual storage. This interaction begins with the second user processor (1105) from where a data request is triggered (1106). Such requests take the form of verbal communication sent over chat channels. The request is received by the Agent (1100) and processed further (1101) to send the product card to the second user. If requested data is available in the virtual storage (1103) system, a display directed towards the second user (1107) is enabled. An example of such a situation in practice may look as follows: a visitor enters a web-page or application with an instant messaging system implemented on it, opens a conversation request, and asks "what type of product A would you suggest for usage B", then an agent responsible for such a conversation may answer with preselected cards located in the virtual storage presenting three different products corresponding to the need B from the category of products A and two product cards located in the data store corresponding to the need B from the category of products A. A request does not imply a necessity to communicate with a data storage center as presented in FIG. 11. If the data requested by the second user processor (1105) form a data request sent (1106) and the request receives data located in a virtual storage (1102), the process ends.

The outcome of action presented on FIG. 11 would be that an end-user sees a display of six cards presenting recommendations from the agent. The technical perspective of such interaction is displayed by FIG. 11 which presents how the embodiment of the disclosure operates between a virtual storage (1102), an agent application (1100), and an end-user (second user) (1106). From the perspective of an agent (first user), the disclosure is responsible for a system and method related to display automation.

In the case of inaccessibility of such data in the virtual storage, this embodiment of the disclosure initiates communication with a data storage center (1207) that is on-server processing (1202). The outcome of such action is a display of the product card to the end-user (1208).

This disclosure is designed especially for online-based solutions operating in the Internet environment where the embodiment can communicate with the instant messaging system in a real-time synchronization. The disclosure uses Internet technologies such as API, webhooks, access tokens generation to communicate with the elements of the present invention.

The embodiment of the disclosure can communicate with different elements of storage and validate results of received results based on API formulas as getting for example (1309).

Figure 13:
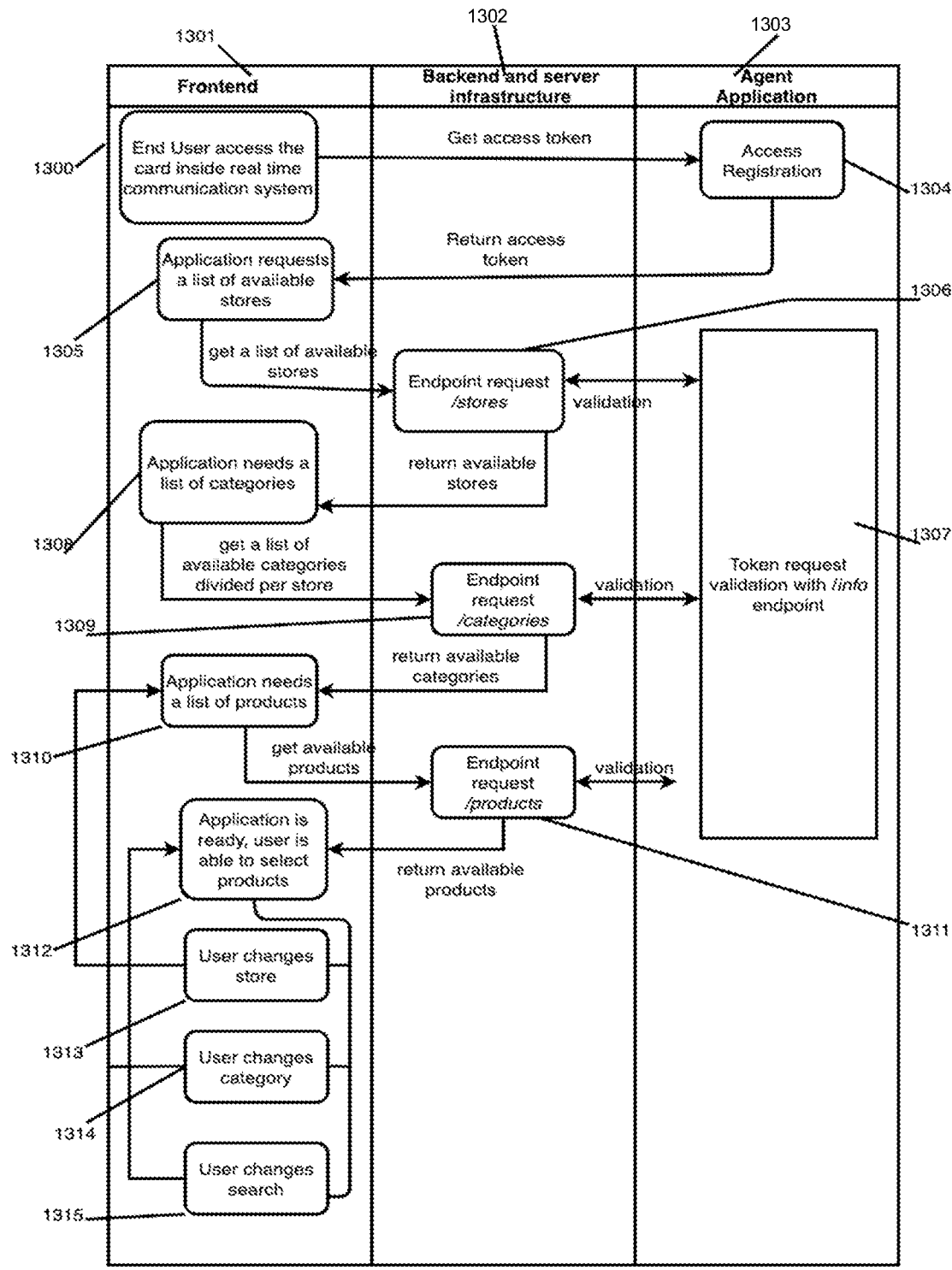
FIG. 13 depicts an interaction between frontend, backend, and agent application while accessing different scopes of data located on at least one of virtual storage or data storage center and it further presents recalls to the validation token.

FIG. 13 depicts another embodiment of the disclosure and how it uses access tokens to validate a query performed by the first user (1307). This validation is enabled via endpoints (1306, 1309, 1311) belonging to the API infrastructure of said disclosure that facilitates communication between the chat window and selection module. Furthermore, the selection module is configured to work with virtual storage and data storage center to query for data requested by the first user and obtain such data from at least one of the mentioned storage components (1302).

The selection module is further configured to query data located in the data storage center and transfer such data to the virtual storage if the frequency of queries concerning such data is higher than it is for the other data stored in the virtual storage (1310). Once the embodiment of the disclosure is ready to deliver a requested subset of data, the first user of the invention can select a product card (1312).

Furthermore, the selection module is configured to compare the frequency of usage of data used by the first user from the virtual storage and based on this frequency update data stored in the virtual storage. This invention is designed to store data that is the most frequently queried in the virtual storage, configured on the first user browser, and the data that are less frequently queried in the structured data storage center.

The virtual storage is configured to collect only the data that is of high usage and to communicate with the selected module so as to adjust the scope of data stored therein.

The present invention uses a system of callbacks enabling fluent communication with the data center but also operates on previously mentioned local storage which enables it to keep previously selected data within browser memory in case a repetitive call concerning a particular data subset is performed during the same session. In case of change of request, the embodiment of the disclosure refers back to the selection stage to adjust the data (1313). FIG. 13 depicts how three layers of the embodiment interact with each other when it comes to data call back and resource access requests. Actions presented by FIG. 13 may be the outcome of the following situation: a visitor starts a conversation with the chat agent and requests a recommendation distributed by different providers when it comes to the type of product A (1300), the chat agent selects 3 types of stores with recommended products x, y, z (1305) and sends it to the visitor, the visitor requests another type of product recommendation that requires different search categories (1309), and the agent selects another recommended group of stores with another suggested product(s) (1312).

Furthermore, FIG. 13 depicts a situation where the possibility of a callback to the/info endpoint (1307) responsible for validation further causes a requesting of or another search input within the same display area as well as the same chat conversation. This functionality enables the agent to uphold the conversation flow with the end-user while the embodiment conducts another, separate search in the resources of the storage and refers it back via a connector to the agent application and later on after the agent's selection to the end-user communication window.

Each request processed by the embodiment is validated by an element called Token Request Validation, previously also referred to as/info endpoint (1307). This element of the disclosure enables instant messaging solutions to search different data sources which will effectively validate if a recalled data set is accessible and if data requested by the callback should be displayed to the selected end-user. An example of such action may be as follows. Let us assume that agent A can access data storage B which includes store information xyz, abc, efg. The agent searches for a store information abd which is not an element of data storage accessible in B. Consequently, this agent receives information that such validation fails and there is no requested subset of data, furthermore, it may receive a piece of information about similar elements which are accessible in the storage center such as in this case would be with abc store information. The same logic would apply to the following elements accessible via other endpoints presented in FIG. 6 which serve as an example implementation of available elements (1306, 1309, 1311).

Other elements that may be validated are categories and products available in the data storage center or virtual storage. The store may be equalized with any unit distributing a particular product or service which may be suggested by the agent, a category is a subset of data belonging to store scope, for example, store with applications may distribute text editors, then products would refer to particular text editors for example divided by type as online text editors and desktop text editors.

The disclosure also enables a recall to the resource previously selected, if a search conducted via the storage center refers to the same scope then the embodiment refers only to data already available in the local storage with no need to re-apply the search to the main database subset. To ensure operational fluency, the embodiment offers a clear division of what is implemented and managed via backend and frontend infrastructure. Such construction enables the use of on-premises generated OAuth tokens (access tokens presented) to connect the embodiment with a chat system. This limits the possibility that callbacks and requests would be vulnerable to cross-related conflicts.

To facilitate the interaction between the embodiment and the chat system, it is possible to use the following parameters during integration: 1) store identification (1306), 2) page number if displayed object possess more than one, 3) subjective value that allows qualifying objects in accordance with the embodiment user preferences, 4) category responsible for subdivision of the scope of a store (1307), 5) product or service to define the element that will be displayed to the end-user (1307), and 6) sort or direction to organize in what order displayed objects will be accessible to view. The above-listed parameters serve as an example of an implementation that is adequate for a use case that needs to search through different stores to display types of products in organized order to the end-user.

Figure 14:
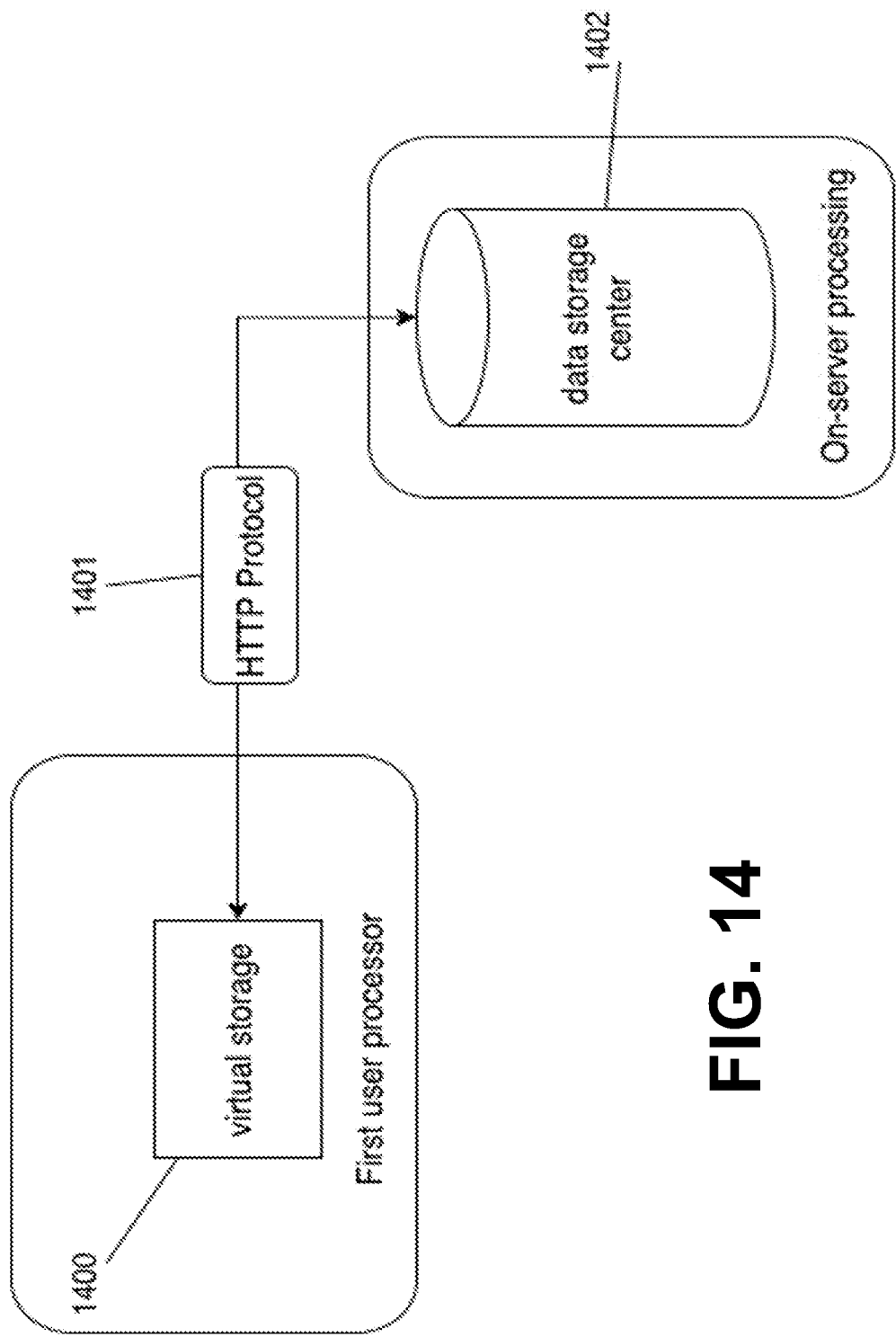
FIG. 14 depicts how virtual storage communicates with the data storage center over HTTP Protocol.
Figure 15:
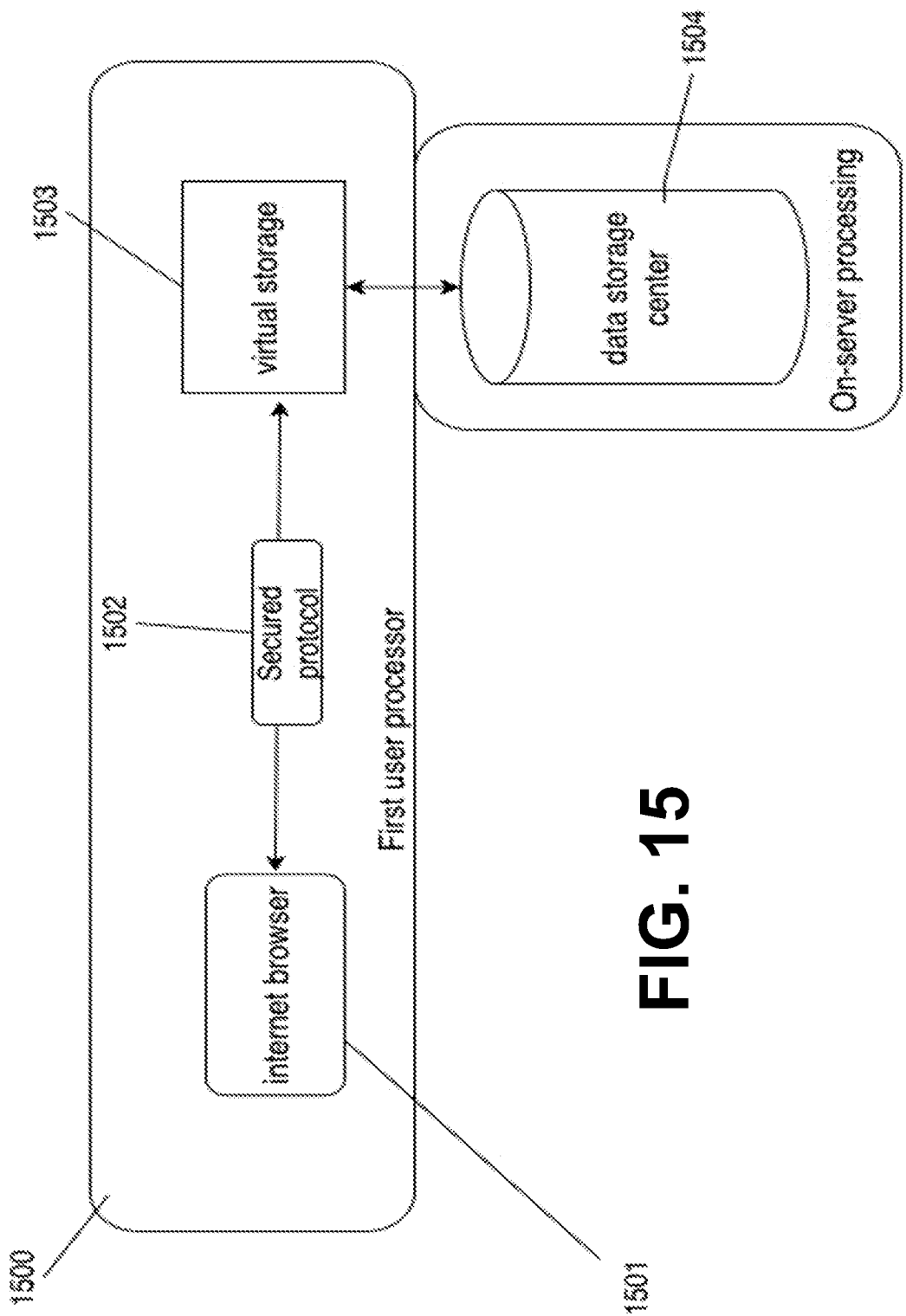
FIG. 15 depicts how virtual storage communicates with the data storage center and with the browser over Secured Protocol.

Data storage center and virtual storage can operate with each jointly basing on HTTP protocol as presented in FIG. 14. This other embodiment of the disclosure contains virtual storage (1400) and is further configured to communicate with an Internet browser (1402) over the secured protocol (1401).

Similarly, an Internet browser (1501) configured and arranged on the processor of a first user (1500) is communicating with virtual storage (1503) and further with data storage center (1504) over a networked connection with secured protocol (1502).

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

What is claimed is:

1. A communication system between at least a first and a second user, wherein the first user is provided with a plurality of data from which to select and send to the second user, the communication system comprising:
   a data input arranged at the first user and configured to receive a request from the first user to access data and send the request to the second user;
   a selection module configured to reference to a virtual storage and a data storage center through an Internet network;
   the virtual storage configured to reference a first transport layer located on the processor of the first user in a browser memory;
   the data storage center arranged at a physical server and configured to collect data accessed less often by the first user than the data collected in the virtual storage from the browser memory; and
   a data display arranged at the second user and configured to depict the data, and
   wherein the virtual storage is arranged on the processor of the first user to collect and maintain only data that is accessed by the first user with a highest frequency.

2. The communication system according to claim 1 further comprising an instant communication channel configured at the processor of the first user and processor of the second user.

3. The system according to claim 1, wherein:
   the data input is further arranged on the processor of the first user and configured to suggest searched items based on recent queries performed by the first user to access data collected by the first user in the virtual storage based on the frequency of access to the data by the first user when compared to the frequency of data accessed by the first usage from the data storage center;
   the data input is further configured to accept alphanumeric character indications of the product name by way of searching data collected by firstly the virtual storage and secondly by the storage center for the requested items;
   the data display is further configured to depict data searched by the first user and suggested the data searched by the first user that are related to the query performed by the first user via data input; and
   the virtual storage is arranged on the first user processor and is configured to collect only the data that is frequently queried by the first user.

4. The communication system according to claim 1, wherein the data display is configured on the processor of the second user to display the data selected by the first user from the virtual storage or the storage center directly in the communication system.

5. The communication system according to claim 1, wherein:
   the selection module is further configured on the processor of a first user and arranged to communicate with data input, virtual storage, and data storage center over the Internet networked connection;
   the selection module is further configured to use API as a means of data exchange while communicating over the Internet network with data input, virtual storage and data storage center
   the selection module is further arranged with independent connection to communicate with at least one of the virtual storage and data storage center;
   the selection module is further configured to send a request to at least one of the virtual storage and the data storage center, to adjust records stored by at least one of the virtual storage and the data storage center; and
   wherein, the selection module is connected to at least one storage and at least one data input place in the instant messaging system.

6. The communication system according to claim 1, wherein:
   the virtual storage and data storage center is networked and configured to exchange data over the Internet network;
   the data storage center is configured to organize data in catalogs based on second user preferences and according to the frequency of usage;
   the data storage center is further configured to save and organize data returned by the virtual storage as not frequently accessed by the first user via query inserted by the data input;
   the data storage center is further configured to share data frequently requested by the first user and save it into the virtual storage;

the virtual storage is configured to enable access to the data queried by the first user via data input in a fastest manner by sorting it in the virtual storage and in case of a query requesting access to a broader scope than the scope of data stored in the virtual storage to call back to the data storage center that is organized based on the frequency of usage; and;

wherein data storage center is located on a physical server that hosts data.

7. The communication system according to claim 1, wherein:

the first user is enabled to select and send the buyer data stored in infrastructure with limited Internet traffic load where the set of data made available to the seller is selectable based upon two subsets, and the communication system further comprises:

a first user processor that receives the request is configured and arranged to communicate with the Internet browser to search the virtual storage and to request data from the data storage center only in case of an absence of such data in the virtual storage;

a first user processor configured and arranged to use the Internet browser memory as the virtual storage wherein a search is performed within the virtual storage assets accessible in the browser memory and categorized by the frequency of usage by the first user;

a first user processor configured and arranged to communicate with the data storage center to perform a search only in case of failure of the initial search in the local storage; and a first user processor configured and arranged to send a response to the server storage via a sequence of callbacks to access elements of the database organized in groups divided by the frequency of usage.

8. The communication system according to claim 1 further comprising a first user processor configured and arranged to receive data from the first server which sends a response to the request and upon this response access local storage and withdraw further callback to the second layer infrastructure.

9. The communication system according to claim 1 further comprising a first user processor configured and arranged to send a request concerning data assets to the virtual storage and upon this response either display requested data or perform a further callback to the second layer infrastructure due to the lack of searched data in the first layer of the storage.

10. The communication system according to claim 2, wherein:

the first user is enabled to select and send to the second user data stored in the second layer of the storage, the data comprising storage units:

the storage units are divided to keep multiple categories of data representing products that the first user presents to the second user; and composition of the storage units is conditional on the frequency of usage performed by the first user.

11. The communication system according to claim 2, wherein the virtual storage is configured on the browser memory of the first user processor arranged to use a secured protocol to communicate with the second layer storage to access data stored by the first user.

12. The communication system according to claim 2, wherein the processor of the first user transmits from the first storage layer to the second storage layer messages as single Hypertext Transfer Protocol (HTTP) chunks.

13. The communication system according to claim 3, wherein:

the virtual storage is configured and arranged with the data search based on the index, category or type of product saved in the database to enable fast selection and retrieval from the database;

the data center storage is configured and arranged with the data search based on the index, category or type of product saved in the database wherein index, category or type, any of which can be used cumulatively as a search category;

the selection module is configured and arranged with a split search in case a requested query outcome is a composition of subsets of data used in different callback functions; and the data search that delivers data divided into smaller catalogs to enable faster retrieval in the assets of the database.

14. The communication system according to claim 2, wherein the first layer local storage and the second layer database storage are configured to:

update stored subsets of data to maintain an updated collection of the data most frequently accessed by the first user to be stored in the virtual storage to reduce the workload on the Internet network facilitating the connection between the browser memory programmed on the device of a first user and storage center arranged at the on-site storage reconfigure and erase stored subsets of data in case of a lack of search requests inserted in the data input search;

change the order of stored data, move data stored in the first layer storage to the second layer storage in case of limited demand on selected data search; and change the order of stored data and move data stored in the second layer storage to the first layer storage in case of growing demand on selected data search.

15. The communication system according to claim 2, wherein the processor of the first user is programmed within a multilayer storage environment data of at least one the virtual storage and data storage center, the processor programmed to:

in response to the query concerning data assets, always use a most accessible data subset requiring a most limited load on the Internet network connection;

perform callbacks that are accessing only the scope of data directly requested by the seller so as not to cause unnecessary delays on data access; and split and access data only in accordance with the requested query regardless of the data storage layer location.

16. The communication system according to claim 4, further comprising:

a database configured to have a multidimensional organization scheme that enables cataloging data by hierarchical ordered by attributes as the frequency of usage, the time necessary to access the data, last usage and first usage; and wherein:

the database is configured to extract elements of data subsets and send it to the virtual storage;

the database is further configured to extract elements of data subsets and store them in the virtual storage;

the database is further configured to reorganize layers of data subsets to minimize the search performed via assets saved in the database; and the database is further configured to perform the reorganization of data subsets as a response to the frequency of search queries inserted into the system via a data input.

17. The communication system according to claim 8, wherein the processor of the first user transmits to the second layer storage an acknowledgment response responsive to transmitting the data to the first layer.

18. A communication method between at least a first and a second user, wherein the first user is provided with a plurality of data from which to select and send to the second user, the method comprising the steps of:
- selecting by the first user data to be displayed to the second user;
- receiving a request from a data input arranged at the first user device to access data;
- sending the request received from the first user device to the second user;
- checking the data requested via data input at the virtual storage configured to reference a first transport layer located on a processor of the first user in a browser memory;
- collecting data that is accessed by the first user which is accessed more often by the first user than the data at the data storage center located on the virtual storage;
- collecting data accessed less often by the first user than the data at the virtual storage from the browser memory;
- displaying to the second user the data from at least one of virtual storage or data storage enter; and
- wherein, collecting data by the virtual storage and data storage center comprises different data and adjustments to the data according to a frequency of access.

19. The method according to claim 18, further comprising steps of:
- checking the data requested by the first user via data input at the virtual storage as a one query comprising entries about all data requested;
- splitting the data requested by the first user via data input into independent queries comprising one value per query;
- checking the accessibility of the data requested by the first user via data input into independent queries comprising one value per query;
- calling data not available in the virtual storage from the data storage center;
- displaying the data requested by the first user that is available in the local storage to the second user;
- displaying the data requested by the first user that is available in the data storage center to the second user;
- saving the data that are the most frequently used by the first user in the browser memory; and
- adjusting the data saved in the browser memory by the frequency of usage performed by the first user.

\* \* \* \* \*